United States Patent [19]

Stanley et al.

[11] Patent Number: 4,945,519

[45] Date of Patent: Jul. 31, 1990

[54] METHOD OF GEOPHYSICAL EXPLORATION

[75] Inventors: Timothy D. Stanley, Broken Arrow, Okla.; John H. Bodine, Houston, Tex.

[73] Assignee: Amoco Corporation, Chicago, Ill.

[21] Appl. No.: 317,301

[22] Filed: Feb. 28, 1989

[51] Int. Cl.$^5$ .................. G01V 1/34; G06F 15/36
[52] U.S. Cl. ........................ 367/48; 367/70; 364/421
[58] Field of Search ............ 367/48, 121, 70; 364/421

[56] References Cited

PUBLICATIONS

Bodine, J. H.; "Waveform Analysis With Seismic Attributes"; 6/9/86, Oil Gas J., vol. 84, #23, pp. 59–63.
Gonzalez-Velasco et al.; "The Analytic Representation of Band Pass Signals"; J. Franklin Inst., vol. 310, #2, pp. 135–142, 8/80.
Sanvicente, E.; "On the Analytical Representation . . . "; Mundo Electron., No. 76, pp. 85–89, 7/78.

*Primary Examiner*—Nelson Moskowitz
*Attorney, Agent, or Firm*—Timothy D. Stanley

[57] ABSTRACT

A geophysical method of exploration including processing and displaying seismic data so as to enhance geophysicists' ability to evaluate and interpret subtle variations in the earth's geological and lithological structure. In particular, an exponentiated phase signal is obtained for a complex signal formed from seismic data exponentiated to a selected power. Displays of the exponentiated phase signal can be produced which visually highlight subtle variations in the earth's geological and lithological structure.

14 Claims, 15 Drawing Sheets

METHOD OF GEOPHYSICAL EXPLORATION

BACKGROUND OF THE INVENTION

The present invention relates generally to the field of geophysical exploration and more particularly to an improvement in processing and displaying seismic data so as to enhance the evaluation and interpretation of subtle variations in the earth's geological and lithological structures.

In the continuing search for hydrocarbons in the earth, geophysicists seek methods for evaluating and interpreting the effects of geology or lithology on seismic data in order to relate such effects to the occurrence of hydrocarbons. For example, Savit U.S. Pat. No. 3,662,325 discloses a method for displaying both extrinsic and intrinsic properties of subterranean formations which are generated from the seismic data. Using such displays, the geophysicist can infer the geological character of the formation and hence, the probability of locating hydrocarbons. Similarly, Rice in U.S. Pat. No. 4,467,461 discloses an interactive technique for color displaying selected combinations of instantaneous attributes of a seismic signal (e.g., amplitude, frequency, envelope and phase) so as to allow an interpreter to more easily comprehend simultaneous variations of several of the instantaneous attributes and to relate these effects to geophysical occurrences of interest. More recently, Stebens, et al., in U.S. Pat. No. 4,633,399 describes a technique for obtaining the instantaneous phase of a rectified signal to aid in interpreting seismic data. In practice, Stebens, et al., obtains a measure of the absolute value of input seismic data from which they determine its Hilbert transform and then compute a rectified instantaneous phase. Alternatively, Bodine in U.S. Pat. No. 4,633,447 describes a technique for obtaining attributes of a complex signal, unlike the instantaneous attributes of Rice, Savit or Stebens, et al., which describe the mean or dominant character of the seismic signal.

In spite of such advances, a continuing need exists to enhance seismic data so as to better evaluate and interpret subtle variations in the earth's geological and lithological structures, such as, stratigraphic traps, pinchouts and reefs associated with weak faulting structures. Moreover, it is especially important to be able to locate hydrocarbon deposits in regions devoid of strong hydrocarbon indicators, such as bright spots. Responsive to such needs, the present invention describes a novel method for processing seismic data to enhance geophysicists' ability to locate and interpret subtle variations in the earth's geological and lithological structures which can oftentimes be associated with the presence of hydrocarbons.

SUMMARY OF THE INVENTION

The present invention relates to a method of geophysical exploration and, more particularly, to an improved method for processing and displaying seismic data so as to enhance geophysicists' ability to evaluate and interpret seismic data.

The present invention comprises exponentiating seismic trace data to a selected power and producing complex signals representative of the exponentiated seismic trace data. Exponentiated phase signals obtained from the complex signals can be displayed so as to enhance geophysicists' ability to evaluate and interpret the seismic data. In particular, seismic trace data are exponentiated to a selected power greater than one. Further, color displays of the exponentiated phase signal can be produced by assigning selected colors to separate ranges of the exponentiated phase signal. By advantageously employing the improved signal-to-noise of the exponentiated phase signal as well as the enhanced resolution afforded by the sharper contrast in the exponentiated phase signal, color displays of the exponentiated phase signal can dramatically, visually highlight subtle variations in the earth's geological and lithological structures generally associated with the presence of hydrocarbons.

The present invention has been found to produce displays having enhanced noise suppression and increased apparent resolution over existing techniques. Such enhanced resolution results from the substantially improved signal-to-noise of the exponentiated phase signal as well as sharper contrast. Consequently, geophysicists are better able to locate and interpret subtle variations in the earth's geological and lithological structures oftentimes associated with the presence of hydrocarbons. These and other benefits of the present invention will be more fully described in the detailed description of the invention and associated drawings.

DETAILED DESCRIPTION OF THE INVENTION

The present invention relates generally to a method of geophysical exploration and more particularly to an improvement in processing and displaying seismic data.

The following introductory discussion of complex signal analysis is provided as an aid in understanding the present invention. A more comprehensive discussion of the application of complex signal analysis to seismic data is provided by M. T. Taner, et al., "Complex Seismic Trace Analysis," Geophysics, Vol. 44, No. 6, pp. 1041-1063 (1979).

Complex signal analysis treats a seismic signal f(t) as the real portion of a complex signal s(t). The complex signal s(t) is thus composed of a real signal f(t) and its corresponding Hilbert transform F(t), i.e., $$s(t) = f(t) + i F(t) \tag{1}$$

where $$i = \sqrt{-1}$$

The Hilbert transform F(t) is generally referred to as the quadrature of the real signature f(t). The seismic signal f(t) can be expressed in terms of a time-dependent amplitude A(t) and a time-dependent phase θ(t) as:

$$f(t) = A(t) \cos\theta(t) \tag{2}$$

Similarly, the quadrature F(t) can be expressed as:

$$F(t) = A(t) \sin\theta(t) \tag{3}$$

As such the complex s(t) is then:

$$s(t) = A(t)[\cos\theta(t) + i\sin\theta(t)] = A(t)e^{i\theta(t)} \tag{4}$$

The treatment of seismic signals as complex signals has resulted in the generation of new parameters for characterizing the seismic data as well as relating variations in such parameters to variations in the earth's subsurface geological and lithological structures. In particular, measures of the instantaneous phase, frequency and amplitude envelope of the complex signal have been produced.

Figure 1:
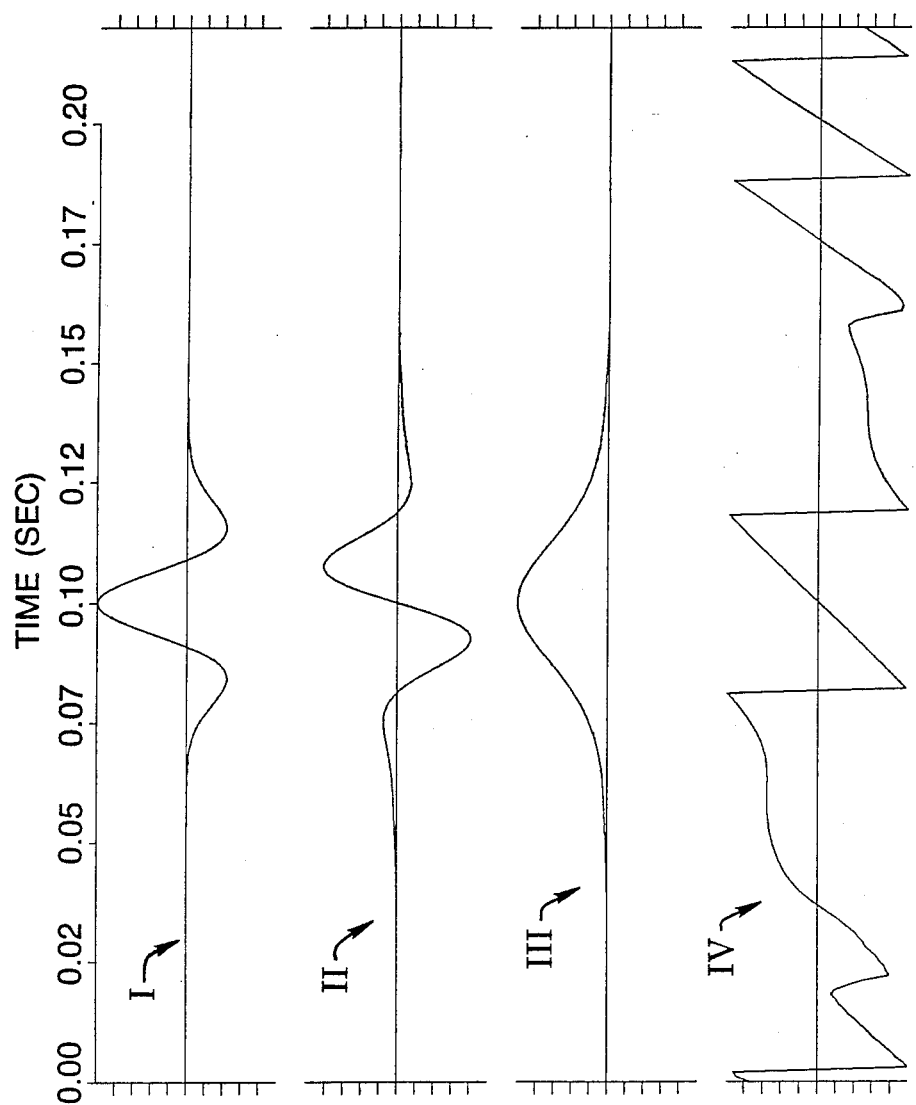
FIG. 1 represents a sequence of processing steps on a simulated seismic trace signal to develop an instantaneous phase signal $\theta(t)$.

FIG. 1 illustrates a sequence of processing steps on a simulated seismic signal for obtaining an instantaneous phase signal θ(t) and consists essentially of processing an input seismic trace f(t) through Hilbert transform Hi[f(t)] and subsequently finding the arctangent of the pointwise ratio of the Hilbert transform to the input seismic trace f(t). In particular, Trace I comprises a zero phase, 25 Hz Ricker wavelet. A selected amount of random noise has been added to the Ricker wavelet so as to simulate a real seismic trace f(t). Trace II represents the Hilbert transform Hi[f(t)] of Trace I, i.e., the quadrature. Trace III represents the amplitude envelope A(t) of a complex signal s(t) obtained from Traces I and II. Trace IV then represents the instantaneous phase signal θ(t) obtained from the arctangent of the pointwise ratio of the Hilbert transformed Trace II to the original Trace I. Thus, $$\theta(t) = \arctan \frac{Hi[f(t)]}{f(t)} \tag{5}$$

Figure 2:
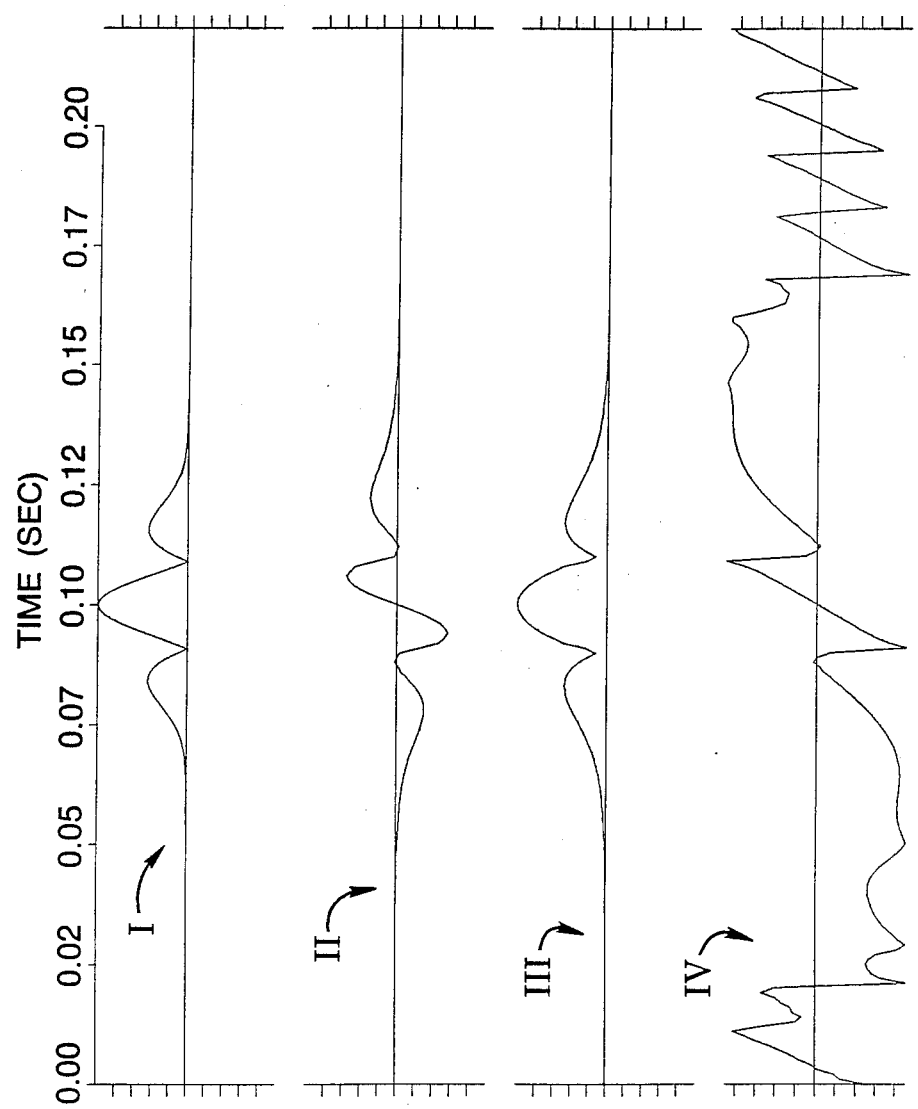
FIG. 2 represents a sequence of processing steps on a simulated seismic trace signal to develop a rectified phase signal $\phi(t)$.

In a like manner, FIG. 2 depicts the development of a rectified phase signal φ(t). Trace I of FIG. 2 represents a rectification of Trace I of FIG. 1. Simply stated, Trace I of FIG. 1 is rectified so as to produce a trace of all positive values. If Trace I of FIG. 1 is denoted by f(t), then Trace I of FIG. 2 can be represented as:

$$|f(t)| \tag{6}$$

In the next step, the Hilbert transformation of the absolute value Trace I yields Trace II which is entirely different from the counterpart Hilbert transform Trace II in the instantaneous phase representation of FIG. 1. The rectified Hilbert transform Trace II can be represented as:

$$Hi[|f(t)|]. \tag{7}$$

Trace III of FIG. 2 represents the amplitude envelope of the complex signal obtained from Traces I and II of FIG. 2.

Trace IV of FIG. 2 illustrates the rectified phase signal φ(t) obtained from the arctangent of the pointwise ratio of the rectified Hilbert transform Trace II to the rectified Trace I as represented by:

$$\phi(t) = \arctan \frac{Hi[|f(t)|]}{|f(t)|} \tag{8}$$

Figure 3:
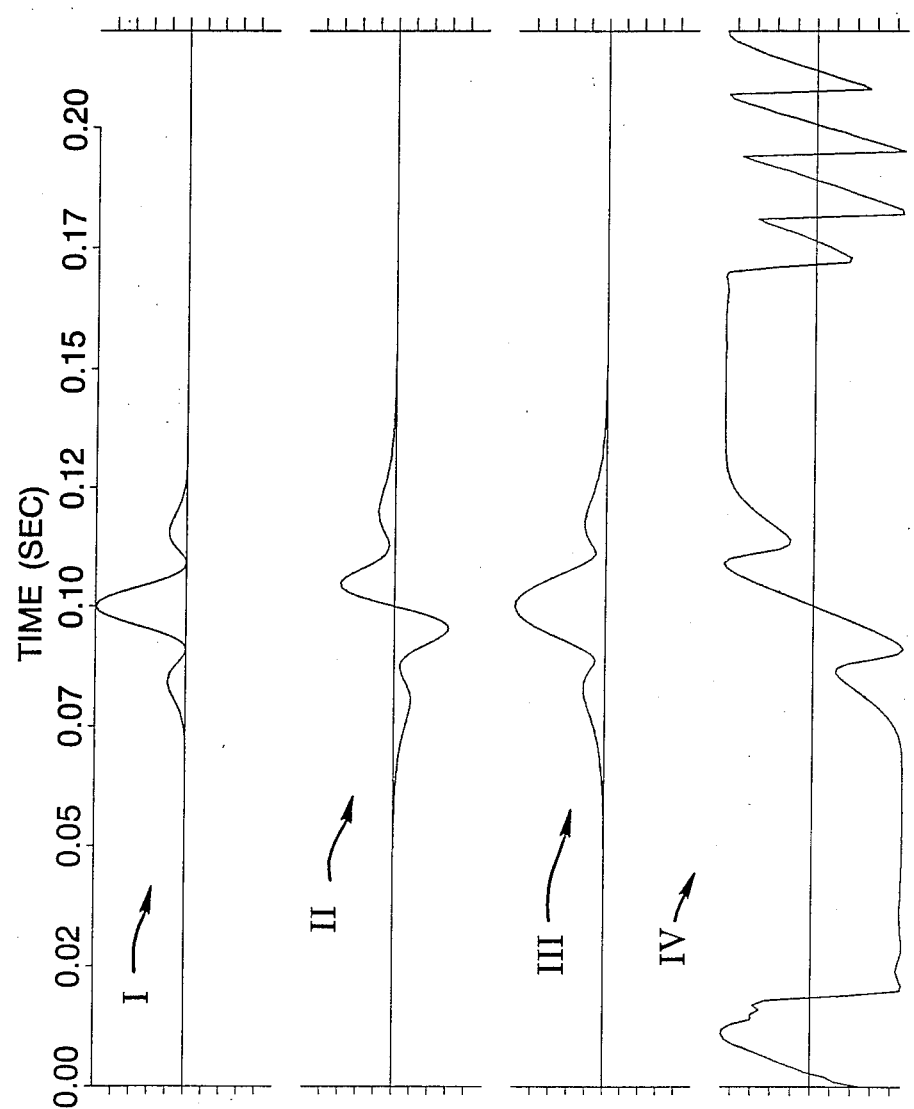
FIG. 3 represents a sequence of processing steps on a simulated seismic trace signal to develop an exponentiated phase signal $\psi(t)$ according to the present invention.

Looking now to FIG. 3, one embodiment of the present invention is depicted. Similar to FIGS. 1 and 2, Trace I of FIG. 3 comprises Trace I of FIG. 1 exponentiated to a selected power n, i.e., (f(t))$^n$. The exponent n can be selected from numbers greater than one. In this example, Trace I has been squared (i.e., raised to the power n=2). Trace II represents the exponentiated Hilbert transform of Trace I, i.e., Hi[(f(t))$^n$]. Trace III represents the amplitude envelope of the complex signal obtained from Traces I and II of FIG. 3. Trace IV of FIG. 3 represents the exponentiated phase signal ψ(t) obtained from the arctangent of the pointwise ratio of the exponentiated Hilbert transform Trace II to the exponentiated Trace I as represented by:

$$\psi(t) = \arctan \frac{Hi[(f(t))^n]}{(f(t))^n} \tag{9}$$

Figure 4:
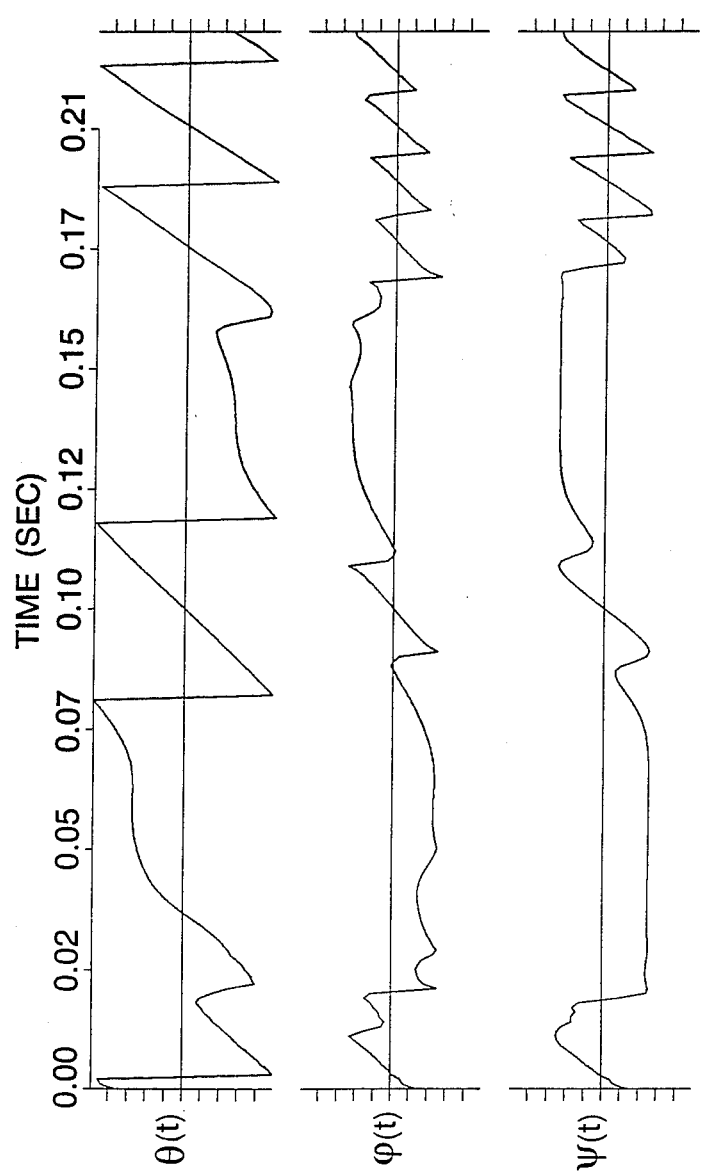
FIG. 4 represents a comparison of the instantaneous $\theta(t)$, rectified $\phi(t)$ and exponentiated $\psi(t)$ phase signals on the same scale.

It is upon comparison of the instantaneous θ(t), rectified φ(t) and exponentiated phase signals ψ(t) in FIG. 4, that the advantages of the present invention may be further clarified. As a matter of note, those skilled in the art will recognize that while the instantaneous θ(t) phase signal can vary from +π to −π, the rectified φ(t) and exponentiated ψ(t) phase signals vary from +π/2 to −π/2. Although all three phase signals correctly identify the characteristic or dominant phase of the Ricker wavelet employed, i.e., 0° phase at 0.10 sec, it is the nature of the variations on either side of this time and the effect of random noise on the phase signals which dictate their individual utility and that of any visual display produced therefrom.

Figure 5:
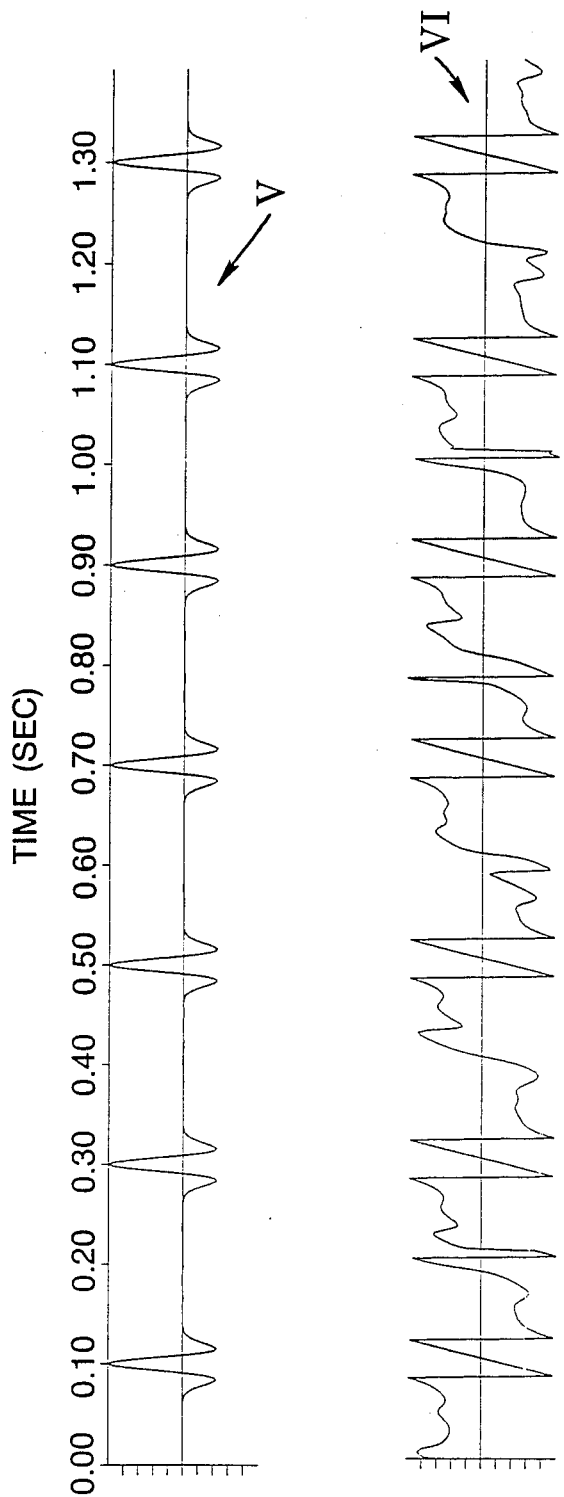
FIG. 5 represents a sequence of simulated seismic waves and an instantaneous $\theta(t)$ phase signal obtained therefrom.

Looking first at the instantaneous θ(t) phase signal of FIG. 4, it can be seen to vary approximately linearly within the time window associated with its Ricker wavelet (i.e., approximately t≈0.07 to 0.11 secs); however, outside this time window random noise causes the instantaneous $\theta(t)$ phase signal to oscillate rapidly both in magnitude and polarity. The nature of such variations are depicted even more dramatically in FIG. 5. In particular, FIG. 5 depicts the effect of random noise on an instantaneous $\theta(t)$ phase signal (Trace VI) obtained from several closely spaced Ricker wavelets (Trace V). Thus, displays of such instantaneous $\theta(t)$ phase data, and in particular color displays as shown later in FIGS. 9 and 12, can oftentimes be extremely confusing.

Figure 6:
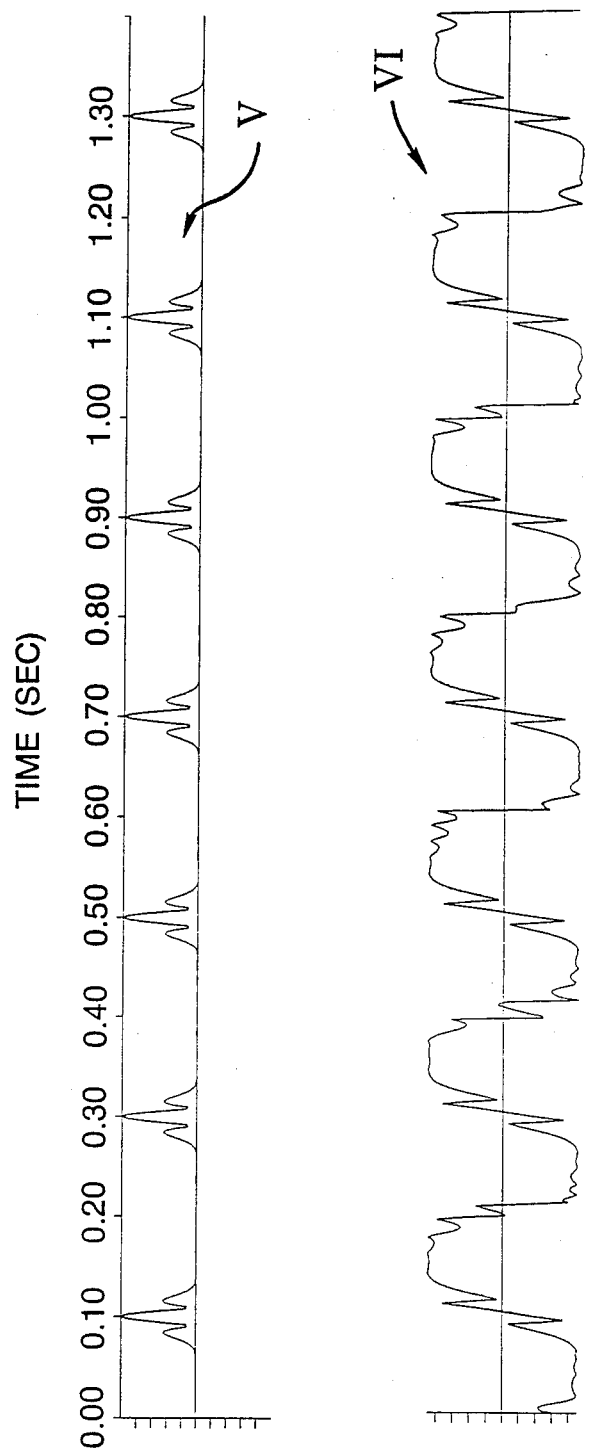
FIG. 6 represents a sequence of simulated rectified seismic waves and a rectified $\phi(t)$ phase signal obtained therefrom.

Looking now to the rectified $\theta(t)$ phase signal of FIG. 4, it can be seen to vary nonlinearly within the time window associated with its rectified Ricker wavelet, and outside this time window the magnitude of rectified $\phi(t)$ phase signal changes no more rapidly than that of the instantaneous $\theta(t)$ phase. However, the random noise induced polarity reversals in the rectified $\phi(t)$ phase signal are postponed to a later time than those in the instantaneous $\theta(t)$ phase signal. Although no substantial actual increase in signal-to-noise is achieved in the rectified $\phi(t)$ phase signal, biasing the random noise induced effects to have generally the same polarity as that portion of the rectified $\phi(t)$ phase signal which is displayed can be used to produce displays of the rectified $\phi(t)$ phase signal which appear to have improved signal to noise. Unfortunately, when the effects of random noise on a series of Ricker wavelets is evaluated (as shown in FIG. 6), it can be seen that the rectified $\phi(t)$ phase signals (Trace VI) associated with each rectified Ricker wavelet (Trace V) are very ragged and that color displays of such signals can be expected to be very "ringy" in appearance as later shown in FIGS. 10 and 13.

Figure 7:
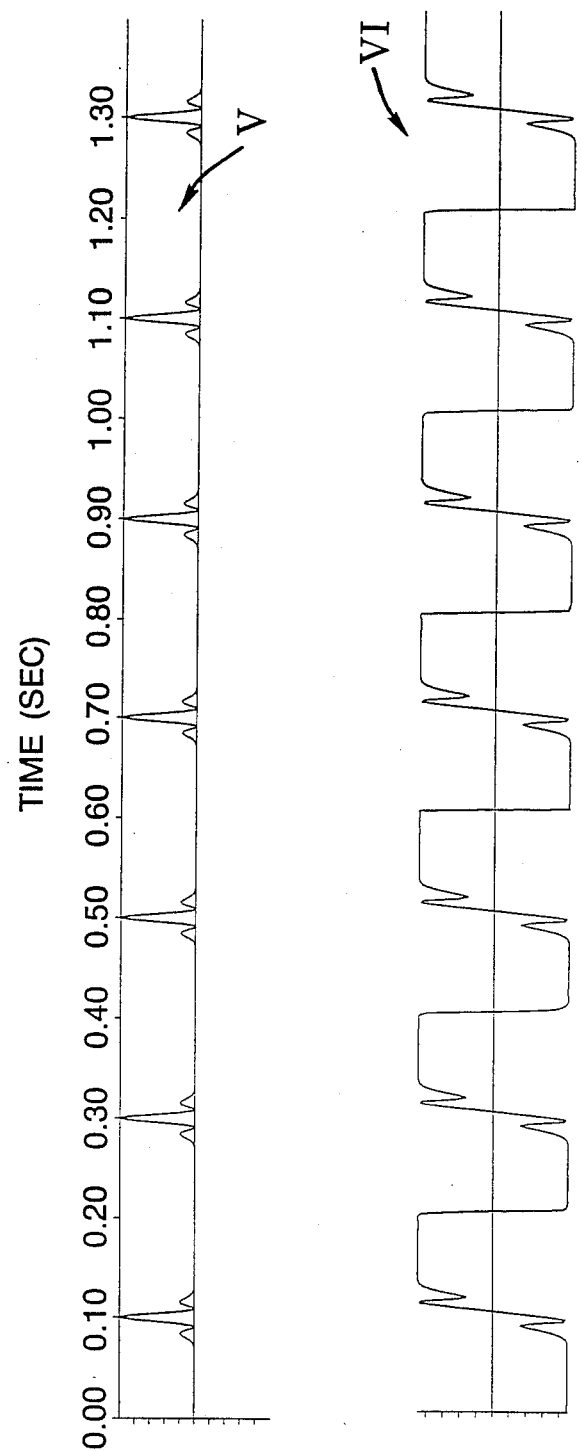
FIG. 7 represents a sequence of simulated exponentiated seismic waves and an exponentiated $\psi(t)$ phase signal obtained therefrom.
Figure 14:
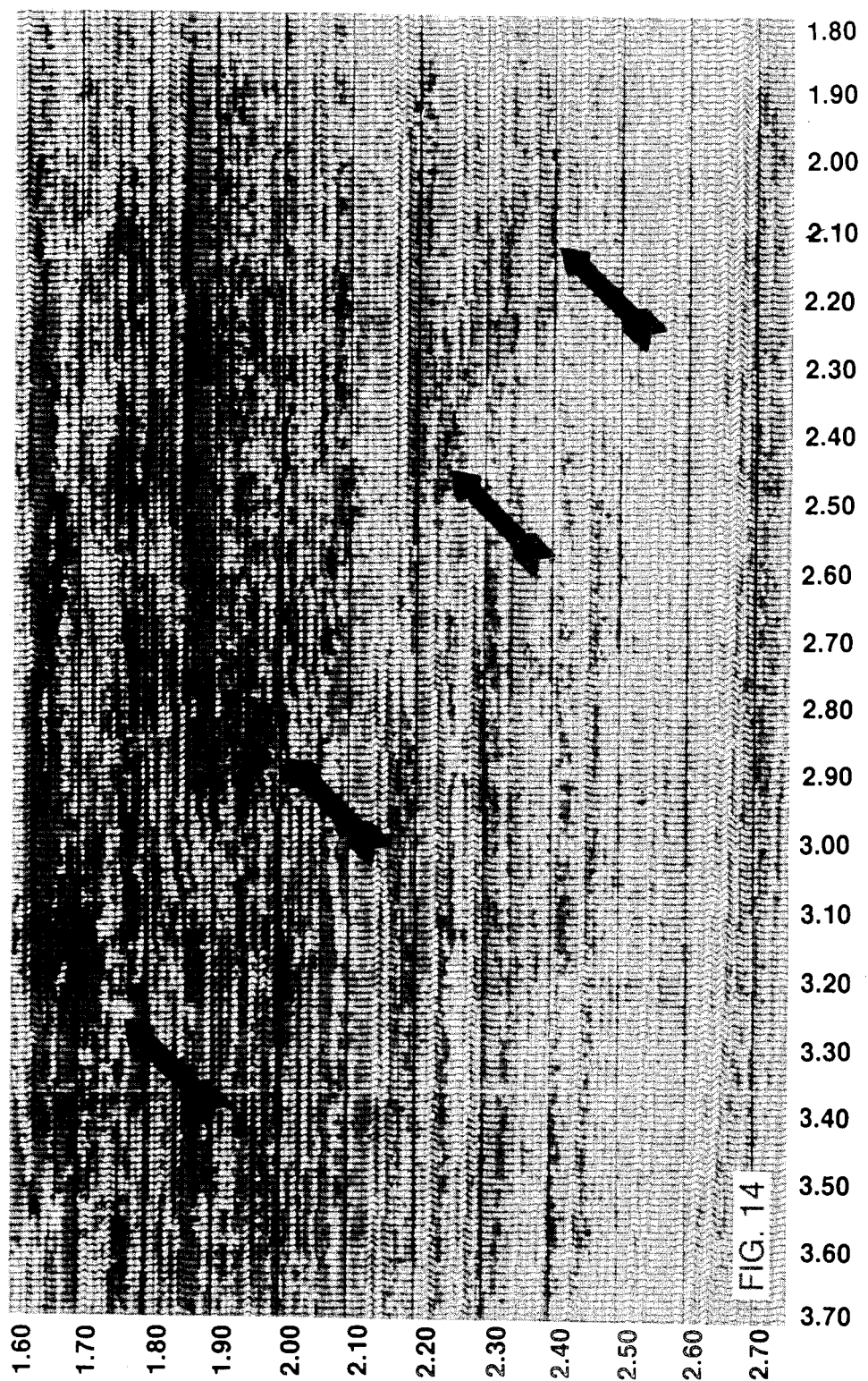
FIG. 14 is a color photograph of a display representing the exponentiated phase $\psi(t)$ signal for the set of seismic data in FIGS. 12 and 13.

Looking next to the exponentiated $\psi(t)$ phase signal of FIG. 4, it can also be seen to vary nonlinearly within the time window associated with its exponentiated Ricker wavelet and have twice the frequency content of the instantaneous $\theta(t)$ phase signal. Outside the time window of its associated exponentiated Ricker wavelet, the effect of random noise on the exponentiated $\psi(t)$ phase signal is delayed longer than in either the instantaneous $\theta(t)$ or rectified $\phi(t)$ phase signals. Moreover, the exponentiating process has substantially suppressed the effect of the random noise to the point that the exponentiated $\psi(t)$ phase signal is extremely stable over a substantial period of time in the presence of noise. That is, a real improvement in signal-to-noise has been achieved. In fact, this improvement can best be seen when looking at the effect of random noise on a series of exponentiated Ricker wavelets (Trace V) and their associated exponentiated $\psi(t)$ phase signals (Trace VI) as depicted in FIG. 7. When compared to the instantaneous $\theta(t)$ phase signals of FIG. 5 and the rectified $\phi(t)$ phase signals of FIG. 6, the exponentiated $\psi(t)$ phase signals of FIG. 7 show a dramatic improvement. In particular, the ragged appearance of the instantaneous $\theta(t)$ phase signals and the rectified $\phi(t)$ phase signals has been suppressed. Color displays of the exponentiated $\psi(t)$ phase signal can also provide better contrast as shown in FIGS. 11 and 14.

Figure 8:
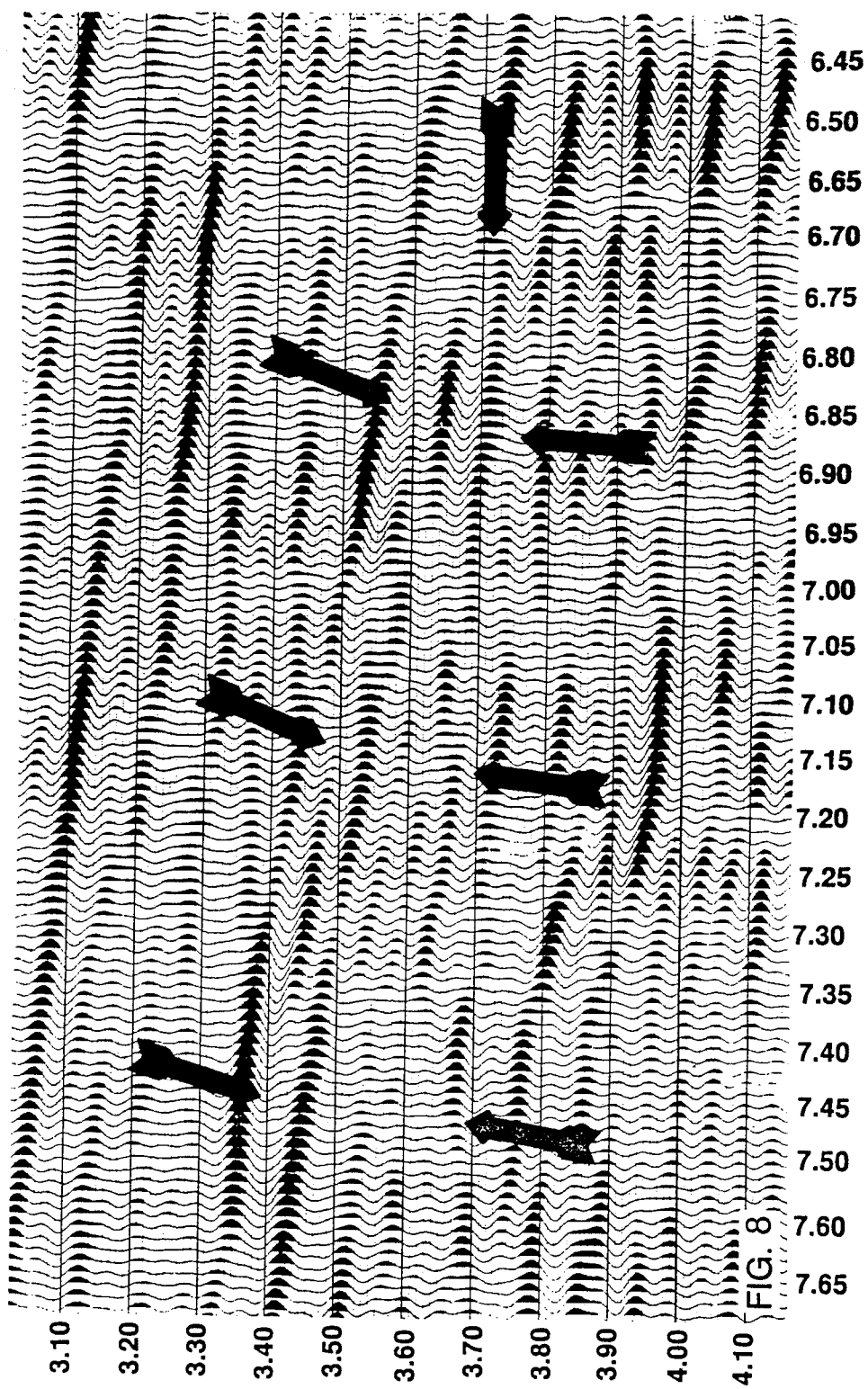
FIG. 8 represents a conventional seismic section.
Figure 9:
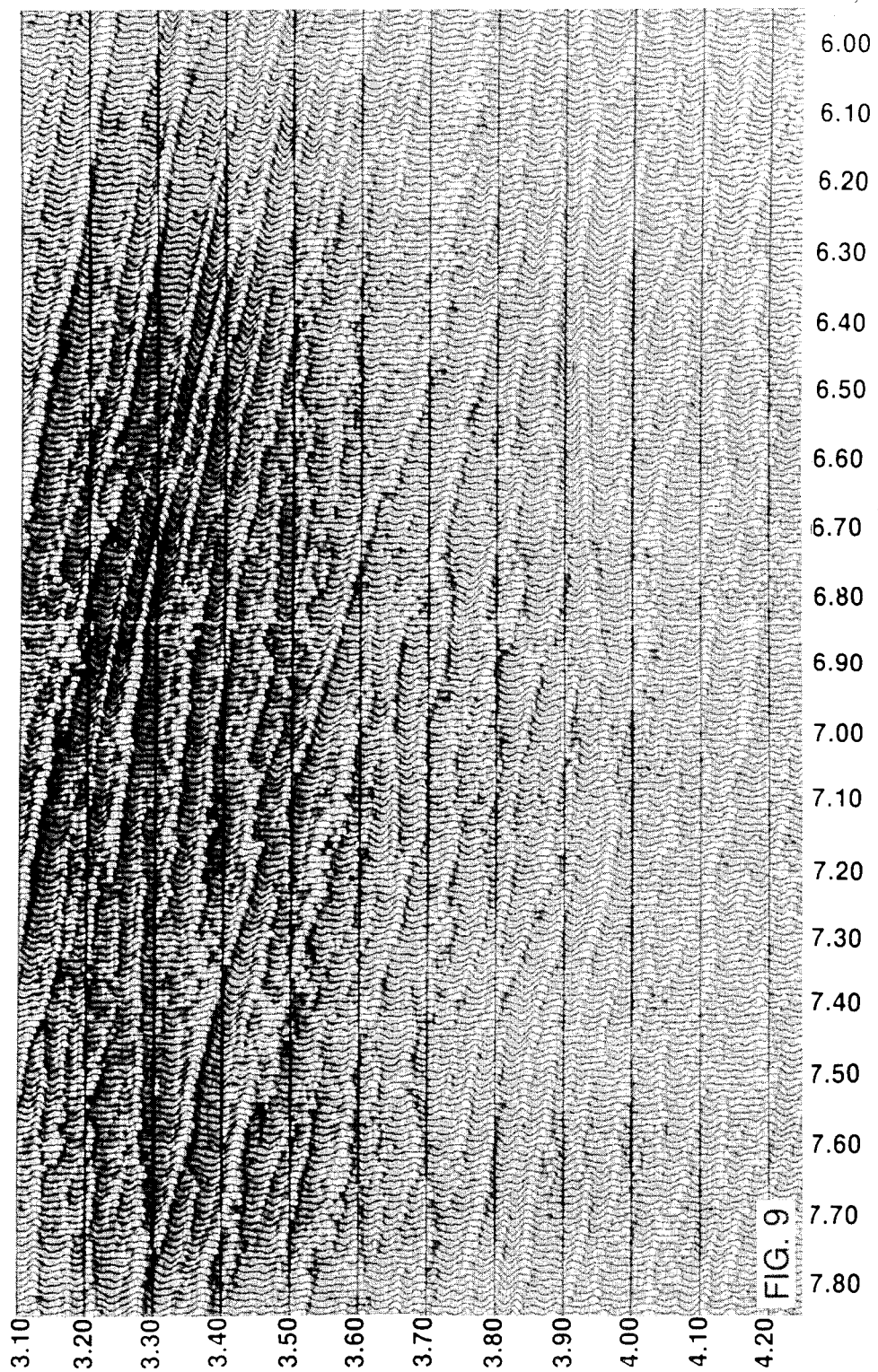
FIG. 9 is a color photograph of a display representing the instantaneous phase signal $\theta(t)$ of the seismic data from FIG. 8.

FIGS. 8, 9, 10, 11, 12, 13, and 14 provide a dramatic illustration, by way of comparison, that effectively demonstrates the value of the exponentiated $\psi(t)$ phase signal over both the instantaneous $\theta(t)$ and rectified $\phi(t)$ phase signals. FIG. 8 represents a conventional black and white wiggle trace display of seismic trace data. In particular, a region of interest is indicated by arrows. Standing alone, FIG. 8 is of little help in interpreting the selected region of interest. At best, FIG. 8 seems to indicate multiple subterranean strata exhibiting generally a left-to-right inclination. FIG. 9 illustrates an instantaneous $\theta(t)$ phase display obtained from the seismic data of FIG. 8. The instantaneous $\theta(t)$ phase display section of FIG. 9 provides little additional insight into interpreting the subsurface structure depicted in FIG. 8.

Figure 10:
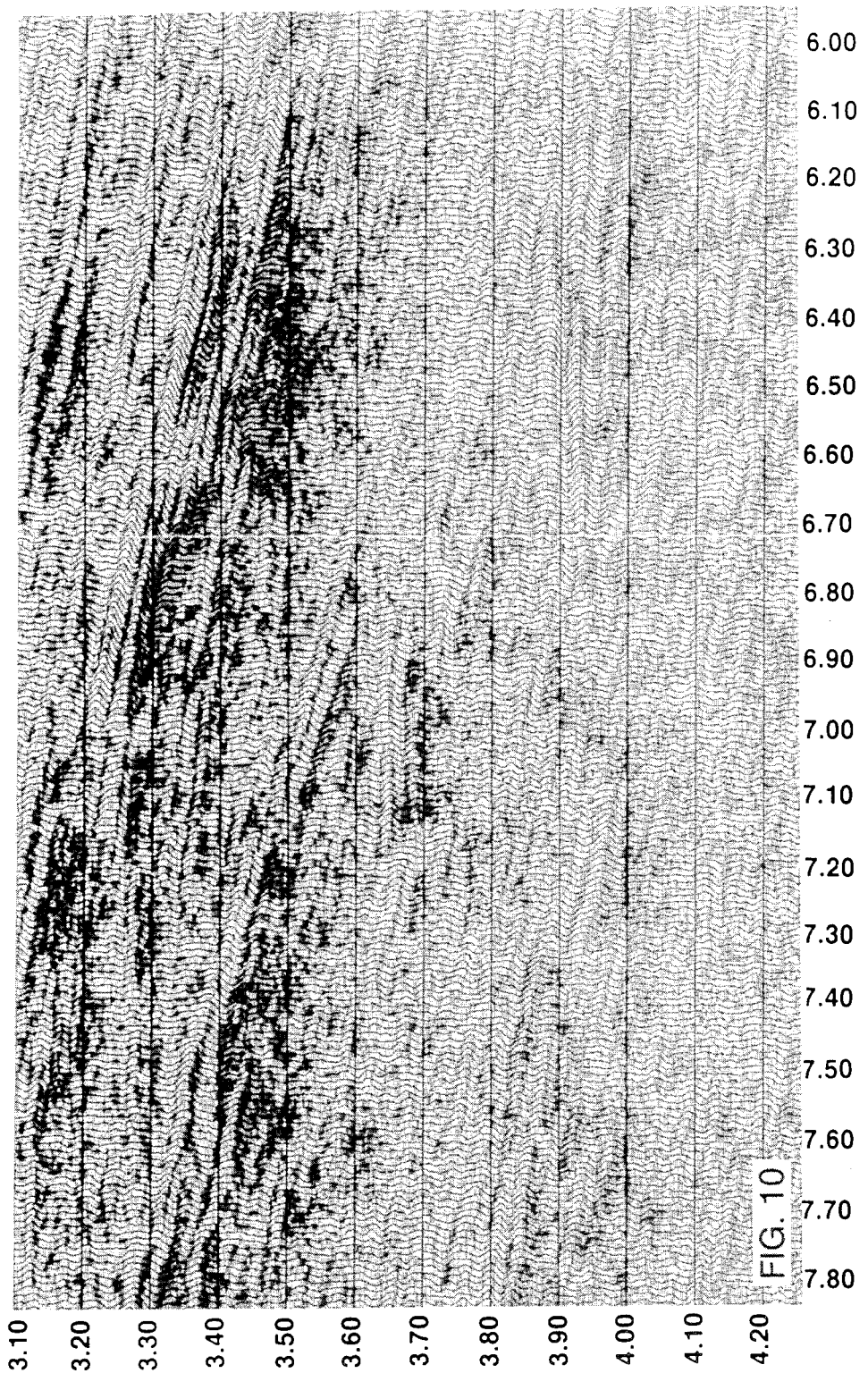
FIG. 10 is a color photograph of a display representing the rectified phase signal $\phi(t)$ of the seismic data from FIG. 8.

FIG. 10 displays the rectified $\phi(t)$ phase developed from the seismic trace data of FIG. 8. An increase in the apparent resolution over that of FIG. 8 is apparent. In particular, the region of interest indicated by the arrows can now be seen to be a pinchout type stratigraphic trap clearly not observable in either FIGS. 8 or 9. However, while the rectified $\phi(t)$ phase display is an improvement over that of either FIGS. 8 or 9, interpretation of the rectified $\phi(t)$ phase display appears very "ringy" and its contrast is poor. Thus, subtle variations in the earth's geological and lithological structures can still be easily overlooked. Such poor contrast is indicated by the "slow" variation in color as the rectified $\phi(t)$ phase signal changes polarity.

Figure 11:
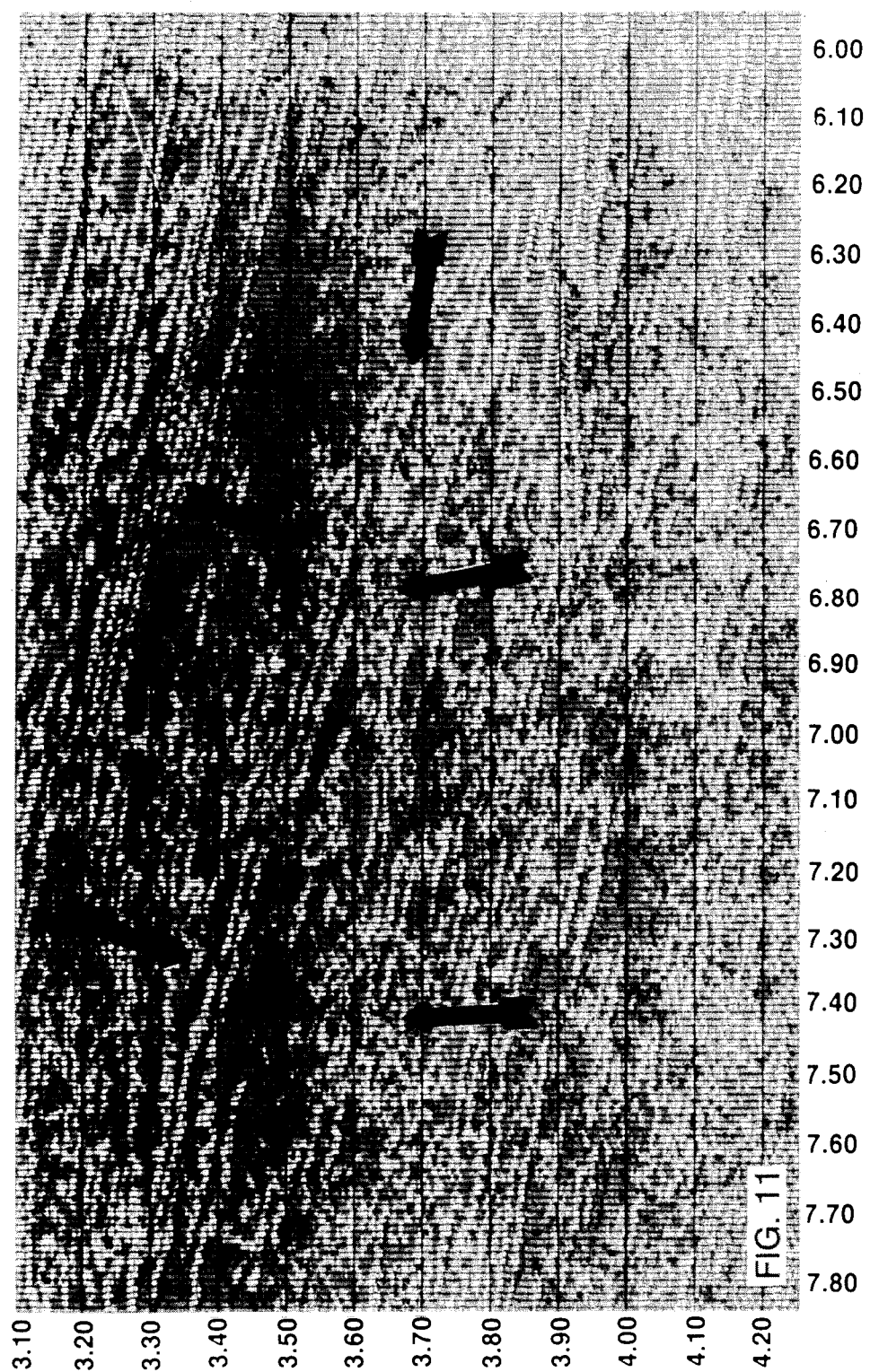
FIG. 11 is a color photograph of a display representing the exponentiated phase signal $\psi(t)$ of the seismic data from FIG. 8.

Looking now to FIG. 11, an exponentiated $\phi(t)$ phase display is provided. The exponentiated $\phi(t)$ phase signals were developed from the seismic section data of FIG. 8. The color scale in FIGS. 9, 10 and 11 runs from purple for 180°, to green for 90°, to yellow for 0°, to magenta for $-90°$ and to purple for $-180°$. The ability to see the pinchout, indicated by arrows, in FIG. 11, over the displays of FIGS. 8, 9 and 10 is clearly demonstrated. Particularly noteworthy are the increased apparent resolution and the sharper contrast which more clearly delineate the stratigraphic trap in the region of interest. Using color displays similar to FIG. 11 in combination with conventional seismic data displays, such as FIG. 8, geophysicists have successfully employed the present invention to identify subtle variations in the earth's geological and lithological structure which can oftentimes be associated with hydrocarbon presence. The color displays of FIGS. 9, 10 and 11 were produced by a Versatec-type color plotter.

Figure 12:
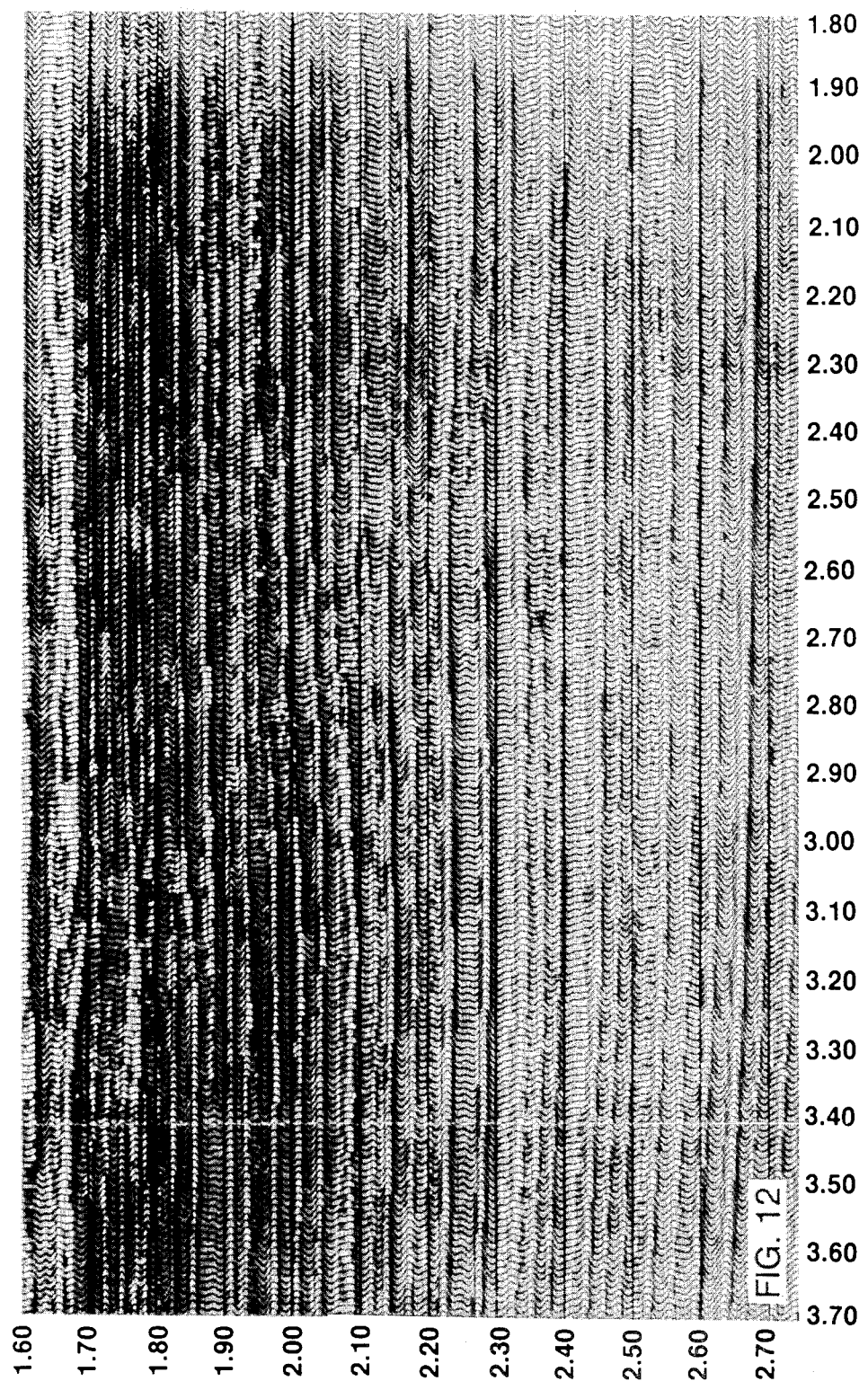
FIG. 12 is a color photograph of a display representing the instantaneous phase $\theta(t)$ signal for a set of seismic data.
Figure 13:
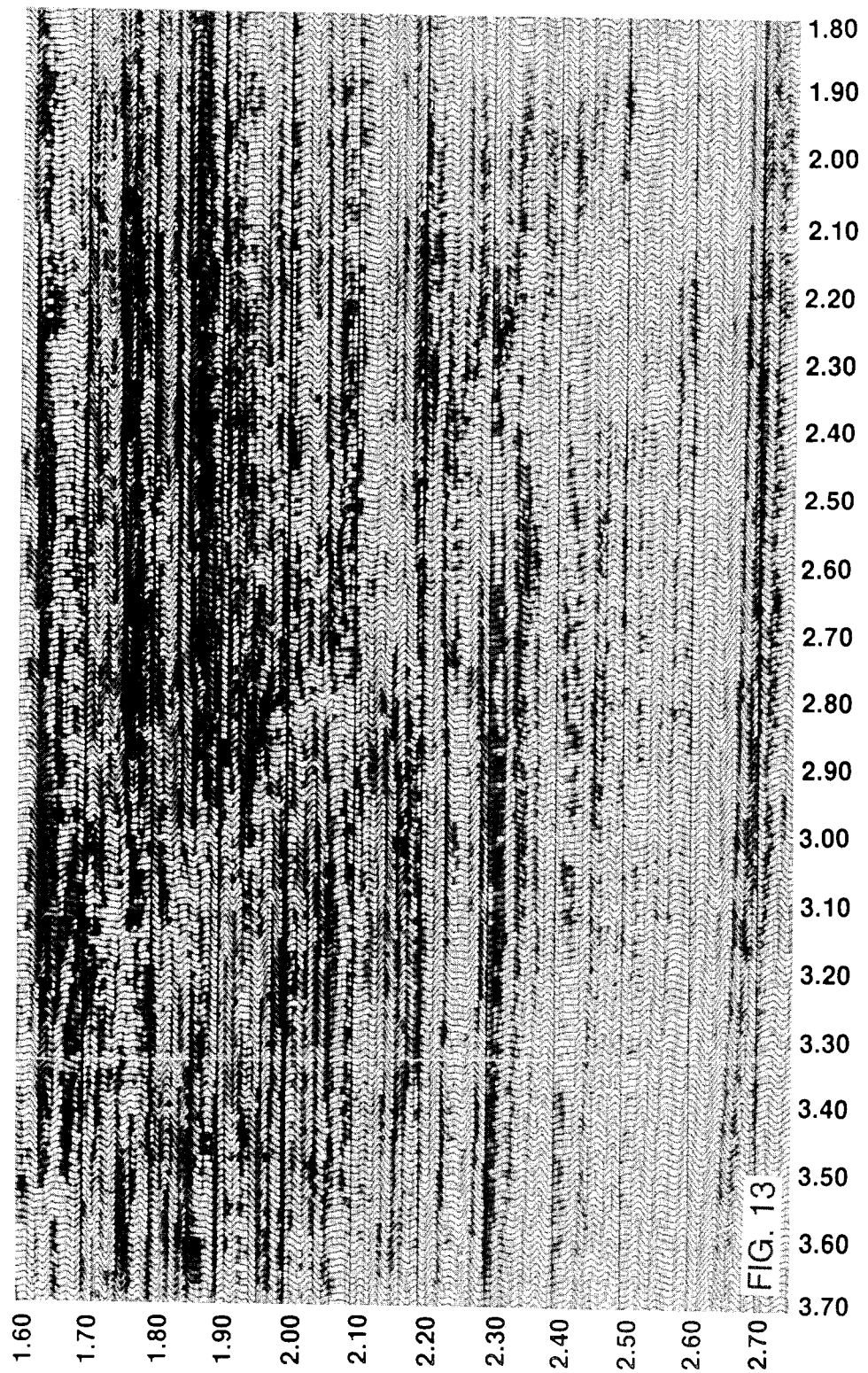
FIG. 13 is a color photograph of a display representing the rectified phase $\phi(t)$ signal for the set of seismic data in FIG. 12.

Looking now to FIGS. 12, 13 and 14, another set of color displays of instantaneous phase $\theta(t)$, rectified phase $\phi(t)$, and exponentiated phase $\psi(t)$ signals, respectively. These color displays were produced by a Versatec color plotter and all three figures employ the same color scale, i.e., purple for $+180°$, green for $+90°$, yellow for 0°, magenta for $-90°$ and purple for $-180°$. The stratigraphic feature of interest in these displays is a subtle fault structure which can best be seen diagonally from top left to lower right of FIG. 14 as indicated by the black arrows. This subtle fault is not apparent in either FIGS. 12 or 13.

Figure 15:
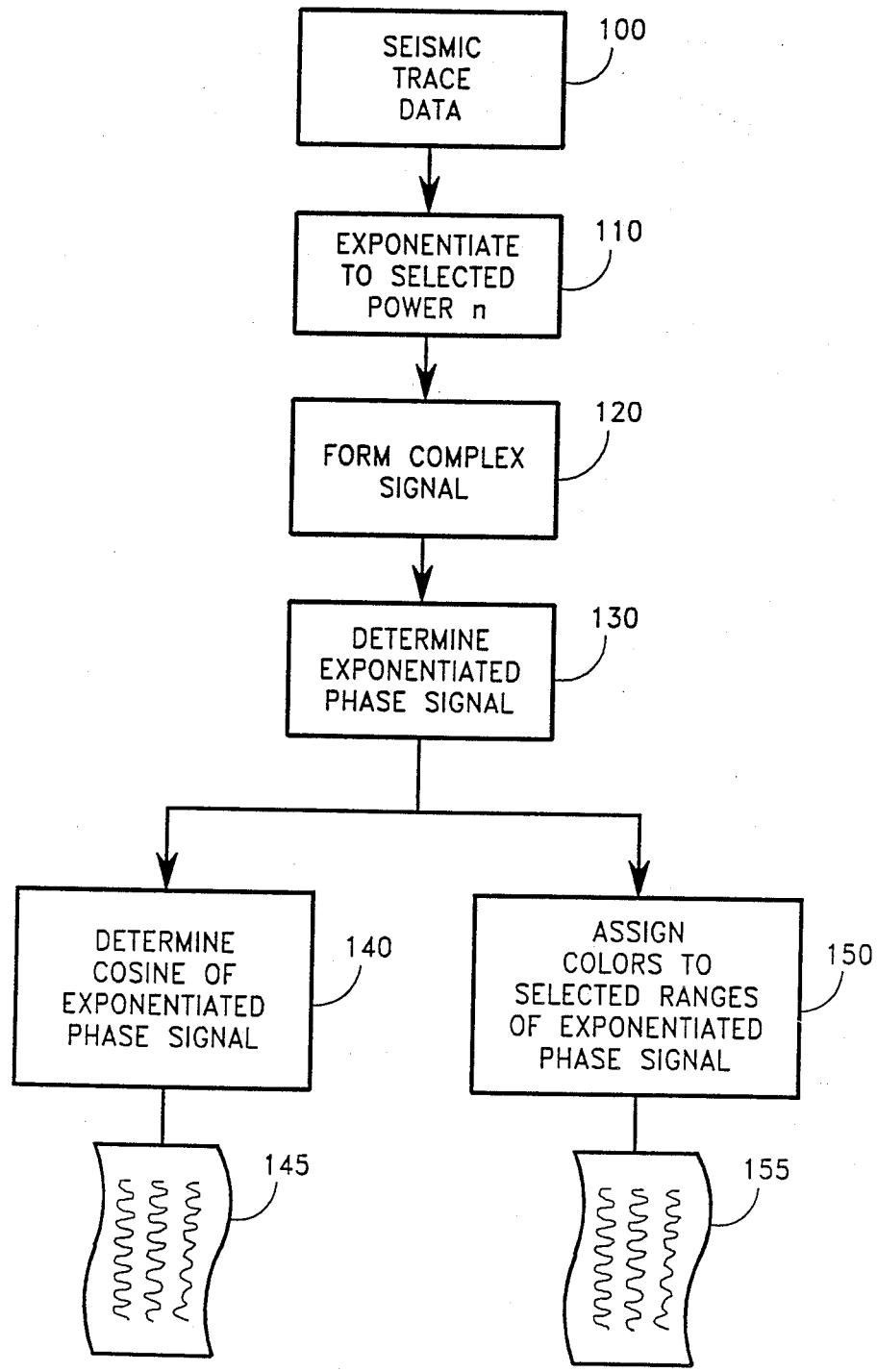
FIG. 15 represents a process flow diagram of the present invention.

Having described the benefits of one embodiment of the present invention, a more detailed description of the present invention is now provided in conjunction with the flow diagram of FIG. 15. At step 100, a set of preprocessed seismic trace data is obtained. Generally, such preprocessed seismic trace data have been filtered, normal moveout corrected, and migrated. The seismic trace data are then exponentiated at step 110 with a selected exponent n. The exponent n is selected from a group of exponents $n > 1$. In particular, we have found even-numbered exponents (i.e., 2, 4, 6, ..., 2n) to be especially useful.

Looking now to step 120, an exponentiated complex signal is obtained from the exponentiated seismic trace data of step 110 generally according to Eqn. (1). At step 130, a measure of the exponentiated $\psi(t)$ phase signal for the exponentiated complex signal of step 120 can be obtained by determining the arctangent of the pointwise ratio of the quadrature of the exponentiated complex signal to the exponentiated seismic trace data as set forth in Eqn. (9).

An important aspect of the present invention resides in the visual displays prepared from the exponentiated $\psi(t)$ phase signals as previously shown. Presently, seismic trace data can be displayed either in color as seen in FIGS. 9 to 14 or in black and white as seen in FIG. 8. In particular, the black and white display of FIG. 8 comprises a series of wiggle-traces representative of the seismic trace data in which the positive amplitudes have been shaded black. While similar black and white displays can be formed from the exponentiated $\psi(t)$ phase signals, it is preferred to first determine the cosine of the exponentiated phase $\psi(t)$ signal at step 140 and then produce a black and white display at 145. Determining the cosine of the exponentiated phase $\psi(t)$ signal is preferred because the exponentiated phase $\psi(t)$ signal may then be represented as a conventional seismic wiggle display, i.e., the cosine of the exponentiated phase $\psi(t)$ signal is a sinusoid or wiggle trace.

Alternatively, color displays of the exponentiated phase $\psi(t)$ signals can be produced by first assigning a separate color to selected ranges of the exponentiated phase $\psi(t)$ signal at 150, e.g., green for $\psi(t) \geq 60°$, light green for $60° > \psi(t) \geq 20°$, yellow for $20° > \psi(t) \geq 0°$, light orange for $-0 > \psi(t) \geq -20°$, orange for $-20° > \psi(t) \geq -60°$, and magenta for $-60° > \psi(t)$ as used in FIGS. 11 and 14. Having assigned separate colors to selected ranges of the exponentiated phase at 150, color displays can be produced at 155 similar to FIGS. 11 and 14.

The foregoing discloses a novel method for processing of seismic trace data to bring about an improved form of instantaneous phase display wherein informational content and interpretability are much improved. In the technique of the present invention, seismic trace data are exponentiated to a selected power greater than one and a complex signal is formed therefrom. The exponentiated phase signal can be displayed as a black and white image, or displayed in a color. Displays formed from the instantaneous phase can be effectively used to locate subtle variations in the earth's geological and lithological structure, which can be associated with the presence of hydrocarbons.

Changes may be made in combination and arrangement of elements as heretofore set forth in the specification and shown in the drawings, it being understood that changes may be made in the embodiments disclosed without departing from the scope of the invention as defined in the following claims.

We claim:

1. A method of geophysical exploration, comprising the steps of:
   (a) obtaining a set of seismic trace data;
   (b) exponentiating each seismic trace to a selected power n where n is greater than 1
   (c) determining the Hilbert transform of the exponentiated seismic trace and determining a ratio of the Hilbert transformed exponentiated seismic trace data to the exponentiated seismic trace data;
   (d) obtaining a measure of an exponentiated phase angle from the arctangent of such ratio; and
   (e) interpreting the geological character of the set of seismic trace data with the exponentiated phase angle.

2. The method of claim 1, further including the steps of:
   producing a display of the exponentiated phase angle.

3. The method of claim 2, further including the steps of:
   assigning colors to selected ranges of the exponentiated phase angle so as to produce a color display of the exponentiated phase angle.

4. The method of claim 2, further including the steps of:
   (a) obtaining the cosine of the exponentiated phase angle; and
   (b) producing a black and white wiggle trace display of the cosine of the exponentiated phase angle.

5. A method of geophysical exploration, comprising the steps of:
   (a) obtaining a set of seismic trace data;
   (b) exponentiating the seismic trace data with a selected exponent n where n is greater than 1;
   (c) forming an exponentiated complex signal from the exponentiated seismic trace data by obtaining a Hilbert transform of the exponentiated seismic trace data and then obtaining a point-wise ratio of the Hilbert transformed exponentiated seismic trace data to the exponentiated seismic trace data and then determining the arctangent of such ratio; and
   (d) obtaining an exponentiated phase signal from the arctangent.

6. The method of claim 5, further including the steps of:
   (a) producing a display of the exponentiated phase signal; and
   (b) interpreting the set of seismic trace data using the display of the exponentiated phase signal to locate and interpret variations in the earth's geological and lithological structure.

7. The method of claim 6, wherein the variations in the earth's structure include stratigraphic traps and faults.

8. The method of claim 6, further including the step of identifying variations in the earth's structure associated with the presence of hydrocarbons.

9. The method of claim 5, wherein the exponent n is selected from the group of 2, 4, . . . , 2n.

10. The method of claim 6, wherein a black and white display of the exponentiated phase signals is produced.

11. The method of claim 10 wherein the cosine of the exponentiated phase signal is determined and the resulting positive amplitudes are shaded black.

12. The method of claim 6, wherein a color display of the exponentiated phase signals is produced.

13. The method of claim 6, wherein the displays of the exponentiated phase signals, comprise color displays of the exponentiated phase signals obtained by assigning selected colors to represent predetermined ranges of values of the exponentiated phase signals.

14. The method of claim 6, wherein the displays of the exponentiated phase signals, comprise black and white wiggle trace displays of the exponentiated phase signals obtained by determining the cosine of the exponentiated phase signals.

* * * * *